Dec. 5, 1950     A. J. BUTTERWORTH     2,532,757
DIFFERENTIAL GEAR FOR MOTOR VEHICLES OR THE LIKE

Filed Oct. 8, 1945

INVENTOR
ARCHIBALD J. BUTTERWORTH

Patented Dec. 5, 1950

2,532,757

UNITED STATES PATENT OFFICE 2,532,757

DIFFERENTIAL GEAR FOR MOTOR VEHICLES OR THE LIKE

Archibald James Butterworth, Camberley, England

Application October 8, 1945, Serial No. 621,117
In Great Britain October 9, 1944

8 Claims. (Cl. 74—710.5)

This invention consists of improvements in or relating to differential gears for motor vehicles or the like and while the invention is applicable to various types of motor vehicle it has special utility in its application to the steering of tracked or track-laying vehicles like caterpillar tractors, bull-dozers or tanks.

One object of the invention is to provide an improved differential gear in which a differential drive is effected by hydraulic means.

A further object of the invention is to provide a differential steering mechanism suitable for tracked vehicles.

Figure 1:
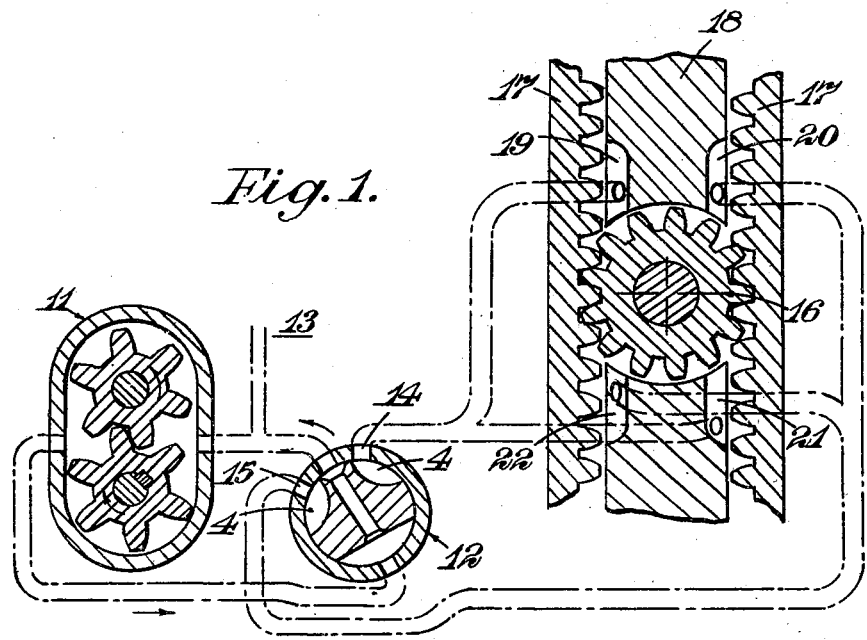
Figure 2:
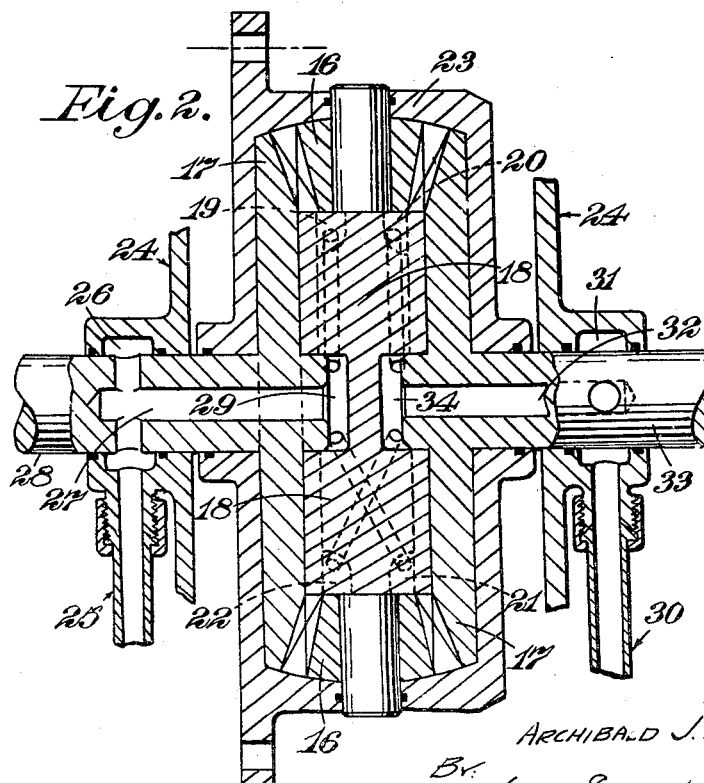

The nature of this invention and of subsidiary features and the manner in which the invention is performed will be appreciated from the following description by way of example of means for steering (or assisting the steering of) a tracked vehicle reference being made to the drawings accompanying the provisional specification in which:

Figure 1 is a diagram showing pump, valve and a developed or projected portion of the differential with oil conduits indicated in chain lines; and Figure 2 is a section of the differential showing the actual arrangement of oil conduits therein.

The tracked vehicle is fitted with an oil pump 11 driven by the engine or transmission and the resulting oil flow passes through a three-way control valve 12 with one outlet connected to a reservoir as indicated at 13, while the other outlet ports 14 and 15 lead to the differential. In the developed portion of the differential in Figure 1, a planet pinion is shown at 16 engaging the driven gear wheels 17. The shroud or filling member 18 (which substantially fills the spaces between the gears and approaches the teeth) has four pockets 19, 20, 21, 22 at the meeting points of the planet pinion 16 with the driven gear wheels 17. The outlet port 14 of valve 12 is connected to the diametrically opposed pockets 19, 21. The outlet port 15 of valve 12 is connected to the diametrically opposed pockets 20, 22. Thus if valve 12 is operated to open port 14 to the pump outlet, oil is pumped under pressure to pockets 19, 21. Port 15 is then coupled by a transfer passage 4 to the reservoir 13. The meshing gears of the differential act as oil driven motors thus effecting differential rotation between the driven gear wheels 17 and consequent steering through the tracks. Referring to Figure 2, the middle part of the shroud 18 appears in section but the arcuate portions lying between the driven gear wheels 17 as indicated in Figure 1 are not apparent in Figure 2. The casing 23 which carries the planet pinions 16 closely embraces the gears. A crown wheel or worm wheel (not shown) is attached to casing 23 by flange and bolt-holes shown at outer periphery and is rotatably driven through the propeller shaft by a pinion or worm in the same manner as the crown wheel or worm wheel in normal differential gears. An outer casing 24 is shown broken away. The pipe 25 from port 14 leads through annular channel 26 in casing 24 and through conduit 27 in half shaft 28 to chamber 29 in the shroud 18 and chamber 29 is connected to pockets 19 and 21 in the shroud. Similarly the pipe 30 from port 15 leads through annular channel 31 in casing 24 and through conduit 32 in half shaft 33 to chamber 34 in the shroud 18 and chamber 34 is connected to pockets 20 and 22 in the shroud.

If it is desired to steer to the left, as viewed in Figure 2, the control valve is turned so as to force oil through 14, 25, 26, 27, 29 to pockets 19 and 21. The oil pressure operates at the points of intermeshing of the pinions and gears to cause the left hand gear 17 to turn more slowly and the right hand gear 17 to accelerate relative to casing 23. This sets up a differential action between the half shafts 28 and 33 and turns the vehicle to the left. The oil passes from pockets 20 and 22 through 34, 32, 31, 30, port 15 and transfer passage 4 to reservoir 13.

When the steering oil-pump is normally driven by the engine, the danger might arise that, in the event of the engine stalling whilst out of gear but with the vehicle in motion, the steering gear would be rendered ineffective. To meet this eventuality, the pump may be driven by the engine through a free wheel or ratchet and pinion, while being connected to the main propeller shaft or gear box output shaft by a suitable gear train and another free wheel device which idles until the engine stalls or drops below a predetermined speed, when it will take up the drive, thus ensuring that whenever the vehicle is in motion there is a certain minimum steering power available.

The arrangement described is cheap, simple and effective. When a tracked vehicle is required to move straight ahead, the differential may be locked by turning the valve to the neutral position in which it is illustrated in Figure 1. In this position oil is not permitted to enter or leave the oil system within the casing 23, and since differential movement cannot take place without displacing oil, then, if any slight leakage is neglected and the oil assumed to be incompressible, the differential will be positively locked, thus eliminating the tendency to wander or the defect of "reverse control" found with former types.

I claim:

1. A differential gear comprising in combination a rotatable casing substantially filled with oil and acting as a planet carrier, a planet pinion mounted in and enclosed within said casing, gear wheels meshing with said planet pinion and enclosed within said casing, a shroud member closely approaching the teeth of said gear wheels and planet pinion and providing two isolated chambers one on each side of the point of engagement of the pinion with a gear wheel, means to force an oil circulation from chamber to chamber by way of the meshing teeth to rotate the planet pinion about its own axis, thereby effecting the differential drive on the gear wheels, and means to reverse the direction of oil circulation.

2. A differential gear comprising in combination a rotatable casing substantially filled with oil and acting as a planet carrier, a planet pinion mounted in and enclosed within said casing, gear wheels meshing with said planet pinion and enclosed within said casing, a shroud member closely approaching the teeth of said gear wheels and planet pinion and providing a single chamber at each side of each point of engagement of the pinion with the gear wheels, means to force an oil circulation from chamber to chamber by way of the associated teeth at each point of engagement to cause rotation of the panet pinion in the same sense about its own axis thereby effecting a differential drive on the gear wheels, and means for reversing the direction of oil circulation.

3. A differential gear comprising in combination a rotatable casing substantially filled with oil and acting as a planet carrier, planet pinions mounted in and enclosed within said casing, gear wheels meshing with said planet pinions and enclosed within the said casing, a shroud member closely approaching the teeth of said gear wheels and planet pinions and providing for at least one planet pinion, a single chamber at each side of the point of engagement of the pinion with a gear wheel, means to force an oil circulation from chamber to chamber past the associated teeth at the point of engagement to cause the planet pinion to rotate about its own axis, thereby effecting a differential drive on the gear wheels and means to reverse the direction of circulation between said pair of chambers.

4. A differential gear comprising in combination a rotatable casing substantially filled with oil and acting as a planet carrier, planet pinions mounted in and enclosed within said casing, gear wheels meshing with said planet pinions and enclosed within said casing, a shroud member closely approaching the teeth of said gear wheels and planet pinions and providing for at least one of said planet pinions a single chamber at each side of each point of engagement of the pinion with the gear wheels, means to force an oil circulation past the associated teeth at each point of engagement to cause rotation of the planet pinion in the same sense about its own axis, thereby effecting a differential drive on the gear wheels, and means for reversing the direction of oil circulation.

5. A differential gear comprising in combination a rotatable casing substantially filled with oil, drive means for said casing, planet pinions rotatable with said casing and gear wheels meshing with said planet pinions, a shroud member closely approaching the teeth of said gear wheels and planet pinions and having four oil pockets at the meeting places of each planet pinion with the driven gear wheels and alternatively a first diametrically opposite pair of pockets is connected to the inlet while the second diametrically opposite pair of pockets is connected to the outlet of the forced oil circulation or vice versa, so that the planet pinion may be forced to rotate on its own axis in one sense or the other.

6. In a motor vehicle a differential gear comprising in combination a rotatable carrier containing planet pinions, gear wheels meshing with said planet pinions, a casing substantially filled with oil in which said gear wheels and planet pinions are enclosed, a shroud member closely approaching the teeth of said gear wheels and planet pinions and providing for at least one planet pinion, two isolated chambers one on each side of at least one of the points of engagement of the pinion with the gear wheels, an oil pump driven from a moving part of said vehicle, a duct connecting said pump and chambers, and a control valve in the duct connecting said pump to said chambers, whereby circulation of oil between each pair of chambers associated with a point of engagement past the associated teeth is permitted in either direction thereby effecting a differential drive on the gear wheels.

7. In a motor vehicle a differential gear comprising in combination a casing substantially filled with oil and rotational drive means therefor, a carrier containing planet pinions within said casing and, rotatable therewith, gear wheels within said casing and meshing with said pinions, a shroud member closely approaching the teeth of said gear wheels and planet pinions but leaving four oil pockets at the meeting places of each planet pinion within the driven gear wheels, an oil pump driven from a moving part of said vehicle and a valve connecting said pump to diametrically opposed pairs of said oil pockets, or to the oil reservoir.

8. In a tracked vehicle, a differential steering mechanism comprising in combination rotational drive means and planet pinions connected thereto, gear wheels meshing with said planet pinions, the said gear wheels and planet pinions being housed in a casing substantially filled with oil, a shroud member closely approaching the teeth of said gear wheels and planet pinions, but leaving four oil pockets at the meeting places of each planet pinion with the driven gear wheels, an oil pump driven from a moving part of said vehicle and a valve connecting said pump to diametrically opposed pairs of said oil pockets, or to the oil reservoir, said valve being operatively connected to a steering control.

ARCHIBALD JAMES BUTTERWORTH.

REFERENCES CITED

The following references are of record in the file of this patent:

UNITED STATES PATENTS

| Number | Name | Date |
| --- | --- | --- |
| 1,099,161 | Brown | June 9, 1914 |
| 1,266,712 | Reagan | May 21, 1918 |
| 2,400,728 | Akers | May 21, 1946 |